US012677136B2

(12) United States Patent
Ren et al.

(10) Patent No.: US 12,677,136 B2
(45) Date of Patent: Jul. 7, 2026

(54) MANAGING ML PROCESSING MODEL

(71) Applicant: QUALCOMM Incorporated, San Diego, CA (US)

(72) Inventors: Yuwei Ren, Beijing (CN); Ruiming Zheng, Beijing (CN); Hao Xu, Beijing (CN); Yin Huang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 18/024,263

(22) PCT Filed: Oct. 13, 2020

(86) PCT No.: PCT/CN2020/120558
§ 371 (c)(1),
(2) Date: Mar. 1, 2023

(87) PCT Pub. No.: WO2022/077202
PCT Pub. Date: Apr. 21, 2022

(65) Prior Publication Data
US 2023/0379692 A1 Nov. 23, 2023

(51) Int. Cl.
*H04W 8/24* (2009.01)
*G06N 20/00* (2019.01)
*H04W 24/02* (2009.01)

(52) U.S. Cl.
CPC ............... *H04W 8/24* (2013.01); *G06N 20/00* (2019.01); *H04W 24/02* (2013.01)

(58) Field of Classification Search
CPC ........ H04W 8/24; H04W 24/02; G06N 20/00; H04L 41/0806; H04L 41/16; H04L 51/58; H04L 51/18; H04L 1/1812; G06F 9/44505
See application file for complete search history.

(56) References Cited

U.S. PATENT DOCUMENTS 10,165,105 B1 12/2018 Do et al.
10,172,184 B2 1/2019 Sharma et al.
(Continued)

FOREIGN PATENT DOCUMENTS

CN 110691385 A 1/2020
CN 111262667 A 6/2020
(Continued)

OTHER PUBLICATIONS

KR_20240165285 (Year: 2024).*
(Continued)

*Primary Examiner* — Nizar N Sivji
(74) *Attorney, Agent, or Firm* — Procopio, Cory, Hargreaves & Savitch LLP/Qualcomm

(57) ABSTRACT

A UE may indicate, to a wireless network, a capability to support one or more versions of an ML processing model, and a wireless network entity of the wireless network may configure the UE to apply a version of the ML processing model that is supported by the UE. The indication from the UE may indicate the capability to support one or more of a first version of the ML processing model that is common across multiple wireless networks and at least one alternate version of the ML processing model, such as a version that is specific to a network. The wireless network entity may configure at least one of a network specific algorithm structure or one or more weights for an network specific machine learning model that is supported by the UE.

32 Claims, 11 Drawing Sheets

(56) References Cited

U.S. PATENT DOCUMENTS

| | | | | |
|---|---|---|---|---|
| 2019/0147849 | A1 | 5/2019 | Talwar et al. | |
| 2019/0393979 | A1 | 12/2019 | Tsai et al. | |
| 2020/0221376 | A1* | 7/2020 | Li | H04W 48/16 |
| 2021/0160149 | A1* | 5/2021 | Ma | H04L 1/0041 |
| 2021/0345134 | A1* | 11/2021 | Ottersten | H04W 16/22 |
| 2022/0394683 | A1* | 12/2022 | Palenius | H04W 48/08 |

FOREIGN PATENT DOCUMENTS

| | | | |
|---|---|---|---|
| WO | 2018005428 | A1 | 1/2018 |
| WO | 2019060195 | A1 | 3/2019 |
| WO | 2020080989 | A1 | 4/2020 |
| WO | 2020108637 | A1 | 6/2020 |

OTHER PUBLICATIONS

3GPP TS 38.300: "3rd Generation Partnership Project, Technical Specification Group Radio Access Network, NR, NR and NG-RAN Overall Description, Stage 2 (Release 16)", 3GPP Standard, Technical Specification, 3rd Generation Partnership Project, Mobile Competence Centre, 650, Route Des Lucioles, F-06921 Sophia-Antipolis Cedex, France, vol. RAN WG2, No. V16.3.0, Oct. 2, 2020, pp. 1-148, XP051961311, Paragraphs 7.5, 14.

Ericsson: "UE Capability ID Based Solutions for Signaling Optimization", 3GPP TSG-RAN WG2 #103bis, Tdoc R2-1815573 (Revision of R2-1814631), 3rd Generation Partnership Project, Mobile Competence Centre, 650, Route Des Lucioles, F-06921 Sophia-Antipolis Cedex, France, vol. RAN WG2, No. Chengdu, China, Oct. 8-Oct. 12, 2018, Oct. 4, 2018, 7 Pages, XP051524892, The Whole Document.

Supplementary European Search Report—EP20956984—Search Authority—Munich—Jun. 5, 2024.

International Search Report and Written Opinion—PCT/CN2020/120558—ISA/EPO—Jul. 15, 2021.

ITU-T Study Group 13, Architectural Framework for Machine Learning in Future Networks including IMT-2020, ITU-T Y.3172(Jun. 2019), Jun. 22, 2019 (Jun. 22, 2019) p. 14, 34 Pages.

* cited by examiner

600

610

620

1002 receive, from a user equipment, an indication of a capability to support one or more versions of a machine learning processing model

1004 configure the UE to apply a version of the machine learning processing model that is supported by the UE

1000

MANAGING ML PROCESSING MODEL

CROSS REFERENCE TO RELATED APPLICATION(S)

This application is a National Stage Application filed under 35 U.S.C. § 371 of PCT International Application No. PCT/CN2020/120558, entitled "METHODS AND APPARATUS FOR MANAGING ML PROCESSING MODEL" and filed Oct. 13, 2020, which is expressly incorporated by reference herein in its entirety.

INTRODUCTION

The present disclosure generally relates to communication systems, and more particularly, to methods and apparatus for wireless communication between a user equipment (UE) and a base station.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication is provided. The method of wireless communication at a user equipment (UE) may include indicating, to a wireless network, a capability to support one or more versions of an ML processing model, and receiving a configuration from the wireless network to apply a version of the ML processing model that is supported by the UE.

In another aspect of the disclosure, an apparatus of wireless communication is provided. The apparatus for wireless communication at the UE may include means for indicating, to a wireless network, a capability to support one or more versions of an ML processing model, and means for receiving a configuration from the wireless network to apply a version of the ML processing model that is supported by the UE.

In another aspect of the disclosure, an apparatus of wireless communication is provided. The apparatus for wireless communication at the UE may include a memory, and at least one processor coupled to the memory and configured to indicate, to a wireless network, a capability to support one or more versions of an ML processing model, and receive a configuration from the wireless network to apply a version of the ML processing model that is supported by the UE.

In another aspect of the disclosure, a computer-readable medium storing computer executable code for wireless communication at a UE is provided. The computer-readable medium storing computer executable code at the UE, the code when executed by a processor may cause the processor to indicate, to a wireless network, a capability to support one or more versions of an ML processing model, and receive a configuration from the wireless network to apply a version of the ML processing model that is supported by the UE.

In an aspect of the disclosure, a method of wireless communication is provided. The method of wireless communication at a wireless network entity may include receiving, from the UE, an indication of a capability to support one or more versions of an ML processing model, and configuring the UE to apply a version of the ML processing model that is supported by the UE.

In another aspect of the disclosure, an apparatus of wireless communication is provided. The apparatus for wireless communication at a wireless network entity may include means for receiving, from the UE, an indication of a capability to support one or more versions of an ML processing model, and means for configuring the UE to apply a version of the ML processing model that is supported by the UE.

In another aspect of the disclosure, an apparatus of wireless communication is provided. The apparatus for wireless communication at a wireless network entity may include a memory, and at least one processor coupled to the memory and configured to receive, from the UE, an indication of a capability to support one or more versions of an ML processing model, and configure the UE to apply a version of the ML processing model that is supported by the UE.

In another aspect of the disclosure, a computer-readable medium storing computer executable code for wireless communication at a wireless network entity is provided. The computer-readable medium storing computer executable code at a wireless network entity, the code when executed by a processor may cause the processor to receive, from a user equipment (UE), an indication of a capability to support one or more versions of an ML processing model, and configure the UE to apply a version of the ML processing model that is supported by the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
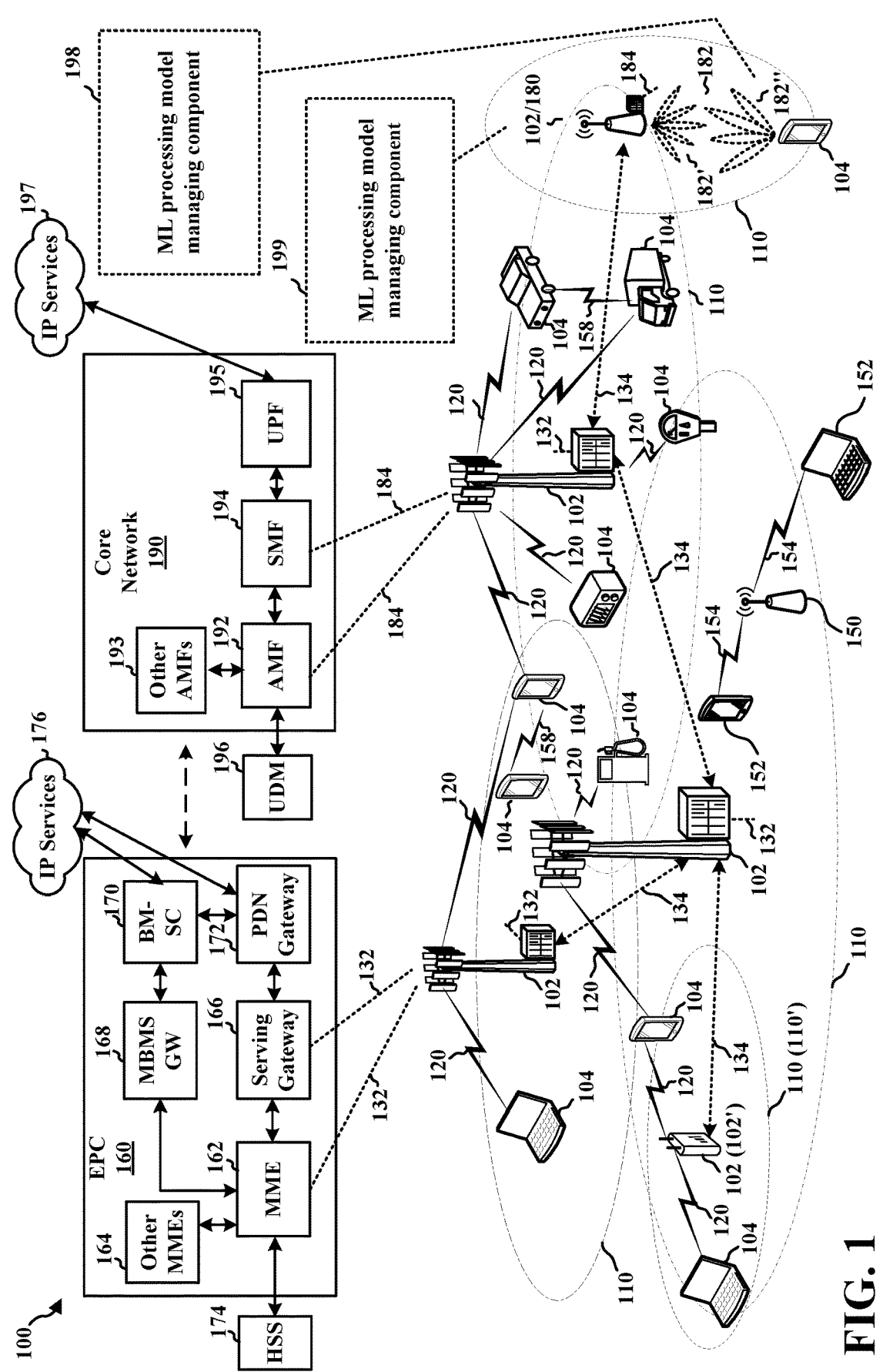
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

A UE in a wireless network may receive measurement information or may perform measurements. For example, the UE may receive data from one or more sensors. The UE may comprise the sensors and/or may receive and process data from a remote sensor. Additionally, or alternatively, the UE may perform various wireless communication measurements (e.g., channel quality measurements, interference measurements, cell measurements). The UE may have capability to process the sensor data and/or measurement data based on machine learning to provide an indication or output to a wireless network. One example of a machine learning application may be for handover measurements in a particular region or under particular conditions, such as on a high speed train.

The machine learning applied by the UE may be based on a model, and the model may be configured for the UE by a wireless network. The model may include an algorithm structure and/or weights that are configured by the network for the UE. In some examples, there may be multiple models any of which may be configured by the network for the UE to apply. There may be a first model that is common to multiple networks, and there may be one or more alternate models. In one example, the first model may be common to multiple network operators, and the alternate model(s) may be specific to a particular network operator. In some examples, the common model may be a more general model for a particular application, and may not be optimized for a particular network. The alternate machine processing model may include an algorithm structure and/or parameters that improve processing for the corresponding network. For the example of a handover application for a UE on a high speed train, the common model may provide a baseline model that may be applied for different UEs and different networks. In contrast, in one example, a network operator specific model may include an algorithm structure and/or weights that improve handover performance for the UE for that particular network.

As presented herein, the UE may provide capability information to the network indicating whether the UE supports the common model and/or one or alternate models. In some examples, the alternate models may be network specific. The concepts presented herein are not limited to network specific machine learning models or operator specific machine learning models and may also be applied for other scenarios of alternate models. The UE may indicate the supported model(s), a version of the model(s), and/or a public land mobile network (PLMN) identity (ID) to the network. The network may configure the UE to apply a machine learning model based on the UE capability. For example, if the UE supports the common model but not an alternate mode, the network may configure the UE to apply the common machine learning model. If the UE supports one or more versions of a network specific machine learning model, the network may select from the supported versions in order to configure the UE to apply a network specific machine learning model. In some examples, the alternate machine learning model may be specific to particular network operators.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIGS. 1 and 2, in certain aspects, the UE 104 may include an ML processing model managing component 198 configured to indicate, to a wireless network, a capability to support one or more versions of an ML processing model, and receive a configuration from the wireless network to apply a version of the ML processing model supported by the UE. In certain aspects, the base station 180 may include an ML processing model managing component 199 configured to receive, from the UE, the indication of the capability to support one or more versions of the ML processing model, and configure the UE to apply a version of the ML processing model supported by the UE. Although the following description may be focused on 5G NR, the concepts described herein may be applicable to other similar areas, such as LTE, LTE-A, CDMA, GSM, and other wireless technologies.

Figures 2A, 2B, 2C, 2D:
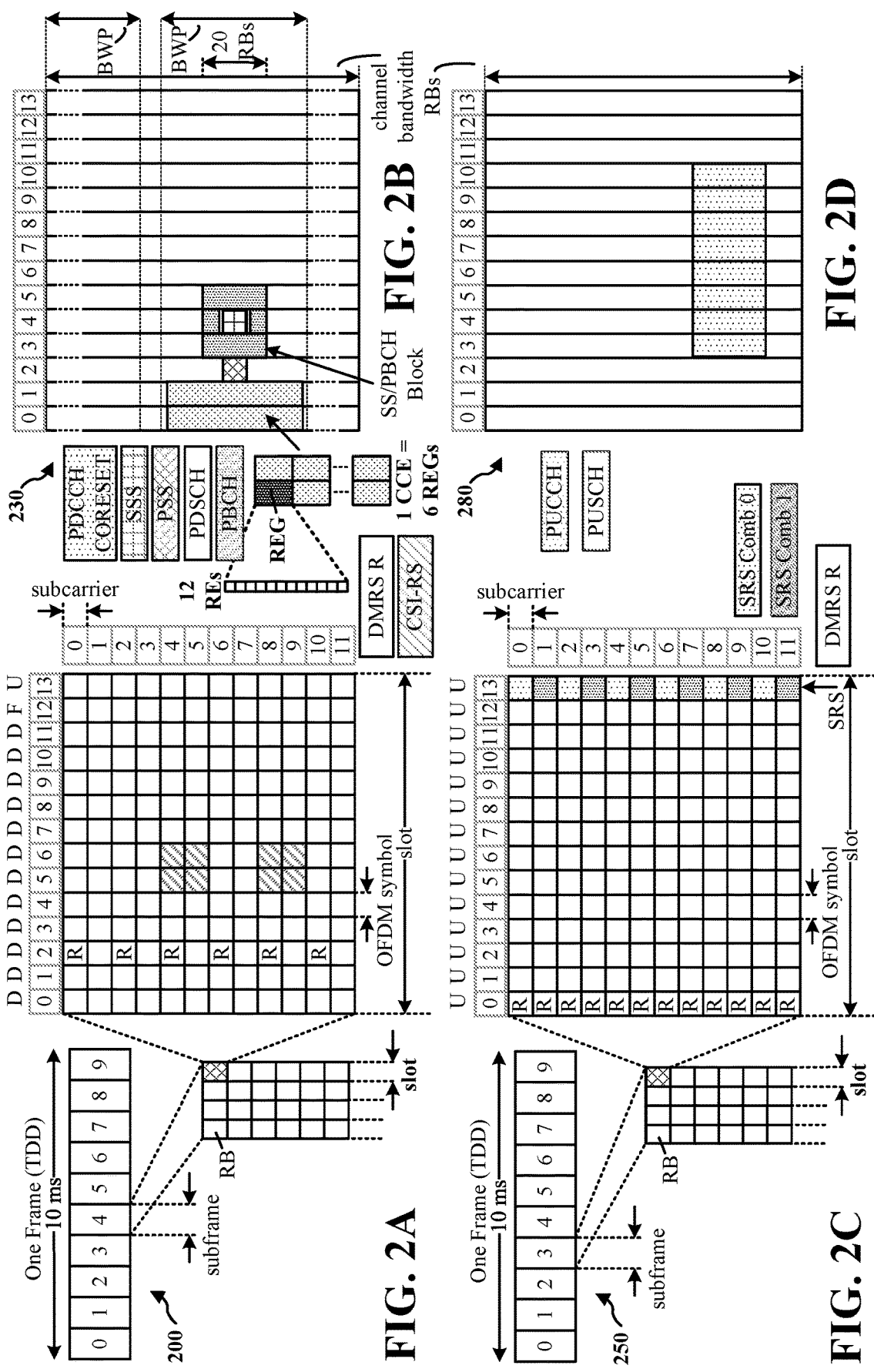
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame.

The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
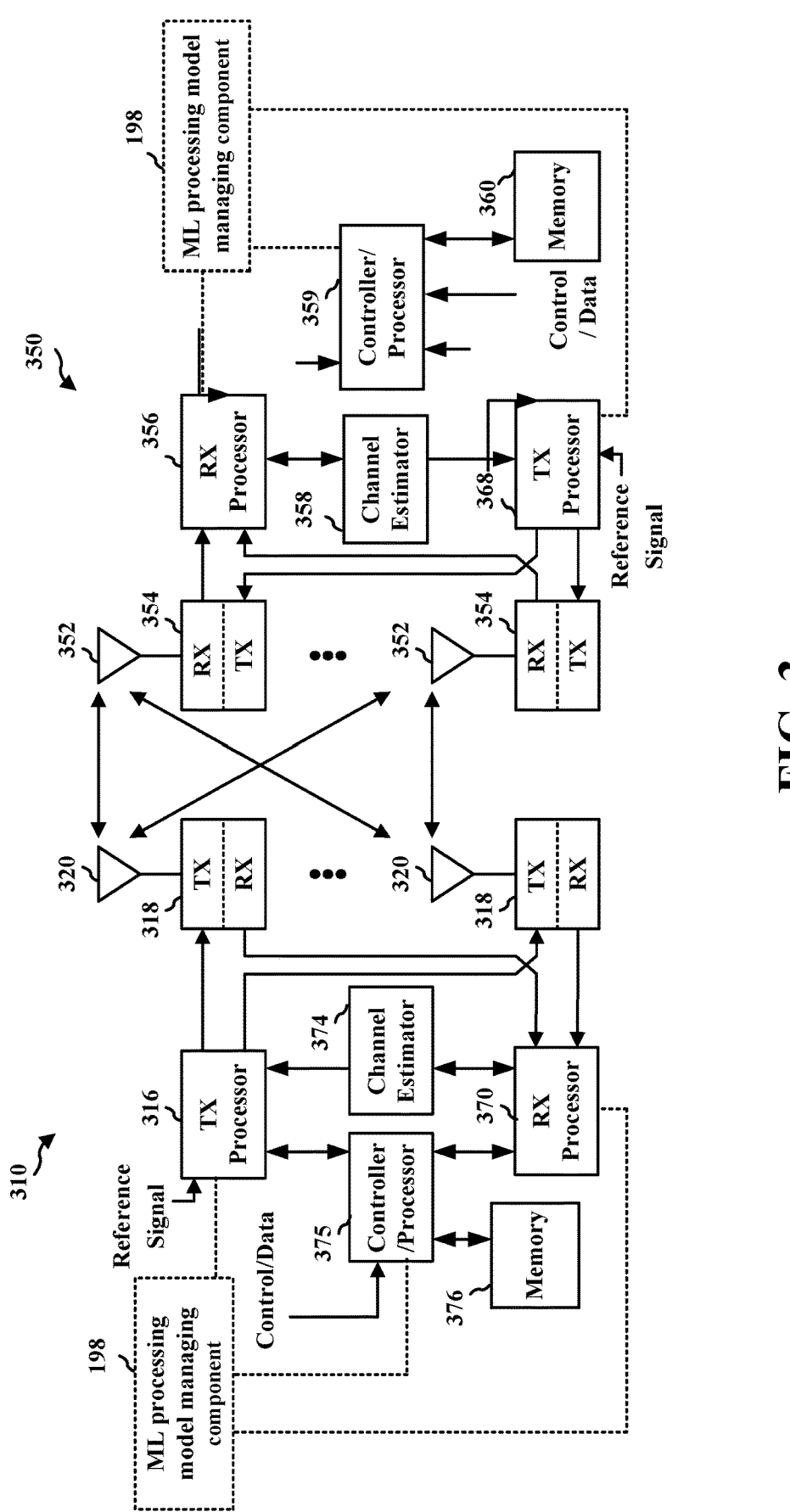
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the ML processing model managing component 198 of FIG. 1. At least one of the TX processor 316, the RX processor 370, and the controller/processor 375 may be configured to perform aspects in connection with the ML processing model managing component 199 of FIG. 1.

Figure 4B:
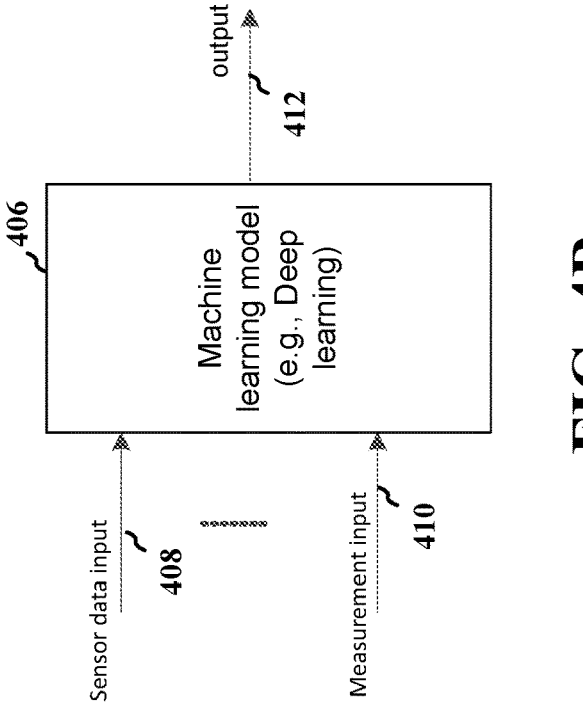
FIGS. 4A and 4B illustrate an example of wireless communication including a ML processing model.
Figure 4A:
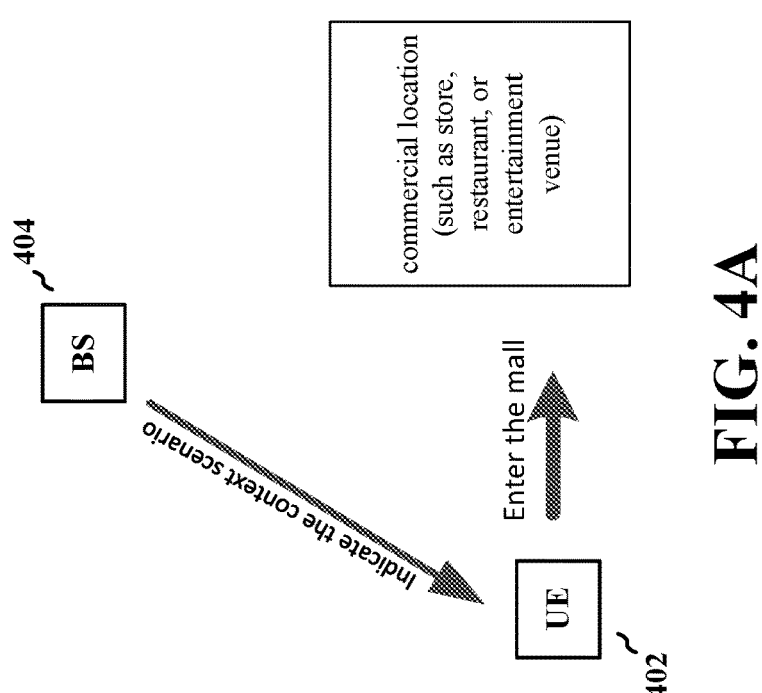

FIG. 4A illustrates an example of wireless communication and ML processing models, for a UE 402 and a base station 404. The UE 402 may provide a device context awareness with a capability for recognizing different context scenarios. FIG. 4A illustrates one, non-limiting example in which a base station 404 may indicate a context scenario, such as a machine learning application for a particular location. Other examples of machine learning based processing at a UE may include a handover application such as on a high speed train. The concepts presented herein are not limited to machine learning processing for identifying context scenarios or for handover applications and may be applied for other UE processing. In FIG. 4A, the location is illustrated as being a commercial location, such as a mall. The UE 402 may provide device context awareness using the ML processing model In one example, the context awareness may relate to particular commercial locations, such as stores, restaurants, or entertainment venues within the commercial location, such as a mall. FIG. 4B illustrates examples of input and output of an ML processing model 406, that may be employed by the UE 402. For example, the ML processing model may be a fusion model. The ML processing model may include algorithms and parameters (e.g., weights) that build a mathematical model based on data in order to make predictions, decisions, or provide other output. The UE 402 may be equipped with one or more sensors, or may receive input data 408 from one or more sensors. The UE 402 may process the data and/or other wireless communication measurement data based on machine learning. The UE 402 may comprise a machine learning engine that can be used for multiple applications, including the device context awareness in FIG. 4A.

Wireless communication devices may process data/measurements based artificial intelligence (AI) in order to provide an output. The device (e.g., the base station 404 or the UE 402) may be configured with multiple sensors and may also be configured with an AI engine (e.g., machine learning) to enable machine learning based actions. The UE may receive input data from sensors such as GPS data with location information, sound data, e.g., from a microphone, visual data from a camera, speed data from an accelerometer, orientation data from a gyroscope, directional data from a magnetometer, biometric data (such as vital sign data) from a biometric sensor, etc. The device may include a ML model 406 configured to receive diverse sensor data input and measurement input. The received inputs (e.g., sensor data, measurement data, etc.) may be combined by the ML model 406 based on machine learning schemes. For example, the UE may perform measurements such as at least one of signal strength indicator (RSSI)/Reference signal received power (RSRP)/reference signal received quality (RSRQ) based on different channels, channel quality indicator (CQI)/precoded matrix indicator (PMI)/rank indicator (RI) calculation, among others. The ML model 406 may receive input data 408 from the one or more sensors and measurement input 410 (e.g., wireless communication measurements) and may process the input data based on a machine learning model having a configured algorithm structure and weights to generate various outputs 412. The output 412 may be a prediction, a decision, or other information that may be used by the UE or that may be reported to the network. For example, the output generated by the ML model 406 may be scenario indication. That is, the ML model 406 may generate an indication of the operation scenario of the UE 402.

For example, the base station 404 may be located at (or close to) a mall and have the capability to recognize the context scenario of the UE 402 attached to the base station 404. The attached UE 402 may be equipped with various sensors, and the UE 402 may report its location/speed/ direction information to the base station 404. The base station 404 may recognize that the UE 402 may be entering the mall, based on its analysis (e.g., deep learning). For example, a UE (such as a smartphone, wearable, etc.) may be connected to a base station, and the smartphone may move from the outside to the indoor (e.g., coffee shop, mall, or other). The UE can imply the corresponding environment, and this implication may be used for other complicate applications. The base station 404 may indicate the recognized context scenario to the UE 402. According to the context scenario recognized by the base station 404, the mall may have high congestion. The base station 404 may configure the resource for the UE 402 corresponding with the context scenario of the UE 402 in the mall. In other examples, the machine learning model may be applied to provide handover information in particular areas or under particular conditions, such as on a high speed train.

Figure 5:
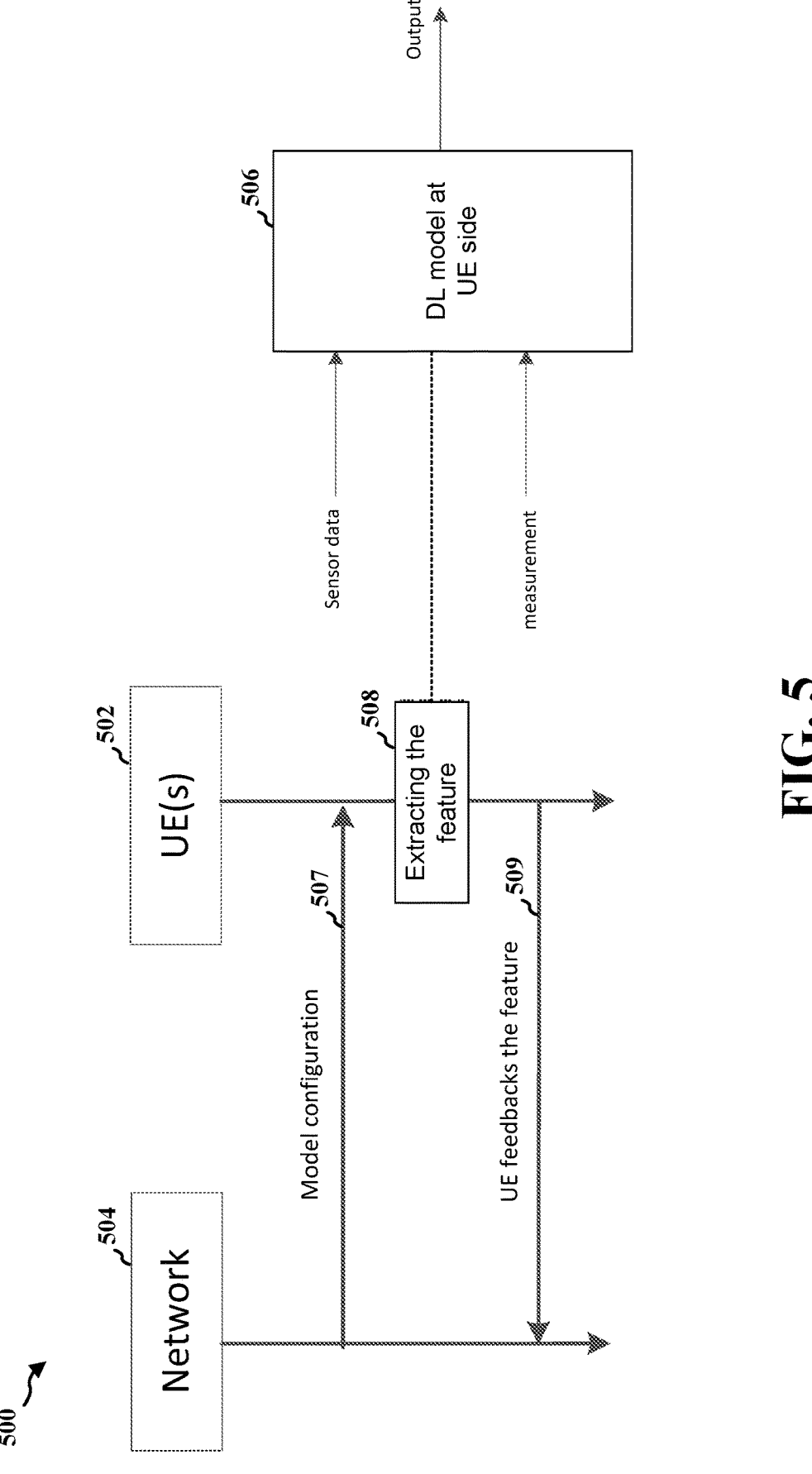
FIG. 5 illustrates an example of wireless communication.

FIG. 5 illustrates an example of wireless communication, including a UE 502 and a wireless network 504, and an ML processing model 506 at the UE 502. The intelligent wireless system may be sourced with various sensor data and environment data. First, the UE 502 may be enabled with the various sensors, including a global positioning system (GPS) for the location information, an accelerometer to record the speed variation, a gyroscope to learn the orientation, etc. The UE 502 may be configured with many environment data based on various measurements. For example, the network configured environment for the channel may include at least one of signal strength indicator (RSSI)/Reference signal received power (RSRP)/reference signal received quality (RSRQ) based on different channels, channel quality indicator (CQI)/precoded matrix indicator (PMI)/rank indicator (RI) calculation and others.

The ML processing model 506 may also include an AI engine to boost application. For example, the UE 502 may comprise the ML processing model 506, which may include a convolution layer that may be used to extract the features of the data, at 508, a sequence model that may track the time-domain variation and predict future actions, and/or an auto encoder structure that may be a candidate for the data compression.

The network 504 may configure the model for the UE 502, at 507. The UE 502 may process various sensor data and environment data based on the model to extract the features, and the UE 502 may feedback on the output to the network 504, at 509. The network 504 may define the model, and the model usually may be a machine learning based solution. The input may be the sensor data or environment measurement, and the output may be the extracted feature. The extracted features may be an intermediate output that may be unexplainable variable or the extracted features may be some specific parameters that may be explainable.

Figure 6A:
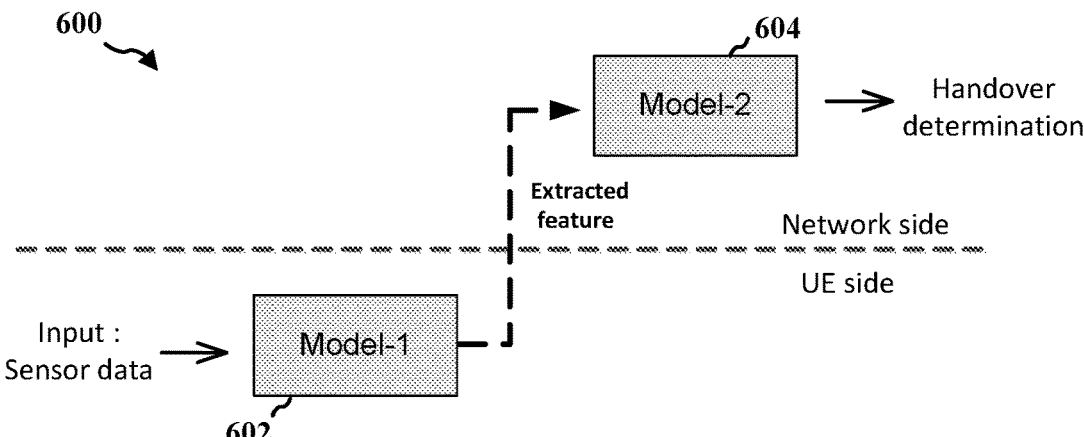
FIGS. 6A, 6B, and 6C illustrate examples of applications of ML processing model.
Figure 6B:
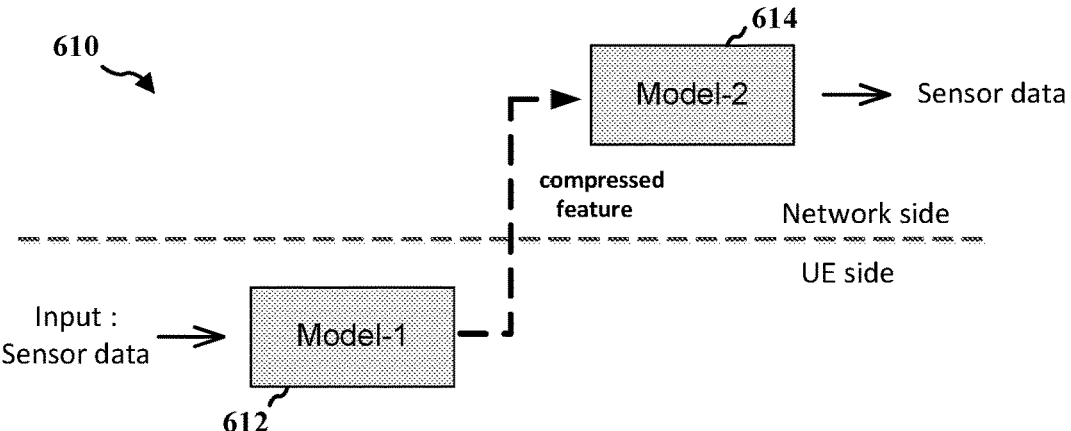
Figure 6C:
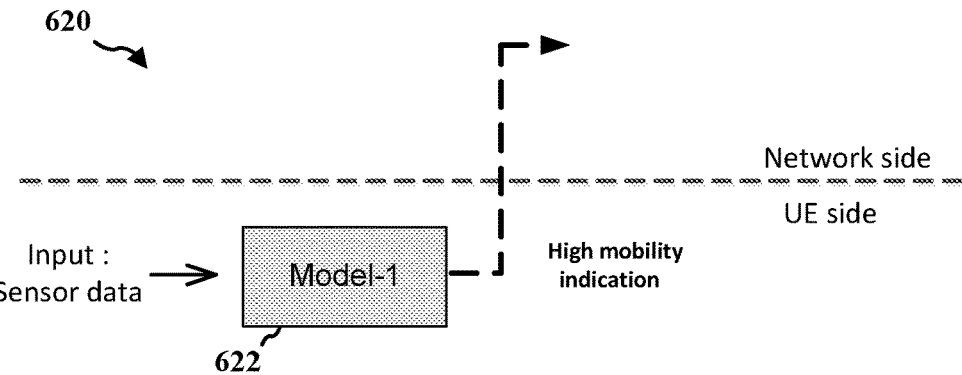

FIGS. 6A, 6B, and 6C illustrate examples of applications of ML processing model. First. FIG. 6A illustrates a first application 600 of ML processing models for intermediate extracted features, such as for handover prediction and/or determination, including two ML processing models. The two ML processing models may include a first model (model-1) 602 on the UE side and a second model (model-2) 604 on the network side. The output of model-1 is the extracted feature for the model-2 to make the handover decision. That is, the first model 602 may receive sensor data as input and feedbacks the extracted features based on the received sensor data to the second model 604. Based on the extracted feature, the second model can determine the final determination, such as the handover decision, based on the intermediately extracted features. The first model 602 may be based on the network configuration. That is, the first model 602 may be configured by the network side.

FIG. 6B illustrates a second application 610 of ML processing models for compressing/decompressing features, such as for the channel estimation feedback, including two ML processing models. The two ML processing models may include a first model (model-1) 612 on the UE side for compression and a second model (model-2) 614 on the network side for decompression. That is, the first model 612 may receive sensor data as input and feedback the compressed feature to the second model 614. The first model 612 may provide the compressed feature based on the received sensor data to the second model 614. The second model 614 may restore the sensor data from the compressed feature. The output of the first model 612 may be the extracted feature (expressed feature), and the output of the second model 614 may decompress the features.

FIG. 6C illustrates a third application 620 of ML processing models for specified final parameters, such as for context awareness indication, including one ML processing model at the UE side. That is, a first model (model-1) 622 on the UE side, configured based on the network configuration. The first model 622 may receive sensor data as input and the output of the model may be specified parameters to indicate current scenarios. For example, based on the model, UE would recognize that it is in the high mobility mode. The first model 622 may be configured by the network, or only based on UE implementation.

In some aspects, the network may configure the ML processing model of the UE for the AI application. The related procedure and signaling to support the configuration may include two parts, including a process of indicating related UE capability to the network and a process of configuring the ML processing model. Furthermore, an operator-based model may match different scenarios. The different scenarios may include procedures for a handover, data compression, or specific indication from the UE side. For example, for handover application, in one specific area, the network deployment may be different among different operators, the handover pattern may be different, or the UE accessing different operators may take different handover actions in the same area. Accordingly, we may configure the operator-based model to support different environments.

In some aspects, multiple types of models may be provided for a particular application. The models may include the algorithm structure and the corresponding weights. The models may include a standard model (e.g., a model that is common to multiple operators) and an operator specific model (e.g., a model that is specific to a particular wireless network operator or optimized for a particular wireless network operator). The standard model may be the model referred to as a common model, and the standard model may be the default option for UEs, supported by various operators, that are enabled with the machine learning function. That is, the standard model may be one basic model for one scenario application without the specific optimization for a particular wireless network operator.

The operator specific model may be based on the operator configuration. The definition of the operator specific model may be related to the implementation of the operator. The UE may support the standard model, and may also support the operator specific model. The UE may support the standard mode and the operator specific model. In some examples, the operator specific model may not be supported by the UE.

One non-limiting example of a machine learning model is a model for a handover indication in a particular area or under a particular condition, e.g., in high-speed train.

In one or more examples, at least one standard machine learning model may be configured for UEs in the scenario that are supported by various networks (e.g., by various network operators). That is, the standard model may provide the baseline machine learning model, which may be applied by various UEs for various networks (e.g., for different network operators). The alternate model may be optimized for better performance for a particular network. Therefore, at least one alternate model may be provided for a particular wireless network (e.g., a particular network operator) to provide a model that is optimized for the specific network. As one, non-limiting example, at least one operator specific model for operator 1 may be provided to match the high-speed train in the area to enable the UE to provide handover indications to the network operator while traveling on the high-speed train. The network may configure the UE to apply the operator specific model. The example of a handover application for high-speed trains is merely one example to illustrate the concept of an application machine learning processing model by a UE. The concepts presented herein may be applied to various different UE applications.

As presented herein, the UE may indicate its capability to the network so that the network can determine whether the UE supports one or more of the machine learning models. In some examples, the UE may indicate its support for one or more machine learning model in UE capability signaling. The UE may provide the capability signaling to the UE. As an example, the UE may provide the capability signaling in RRC signaling to the network. In other examples, the UE may indicate the capability to the network in other signaling. The UE may report its capability to the network, and the network may configure the model for the UE. The RRC signaling may include multiple information elements (IEs). The IEs may be combined, in a single RRC message, or provided as separate IEs. In some examples, the information may be provided in a single IE, e.g., that combines the information about support for different models.

The UE may indicate that the UE supports at least one ML processing model and may indicate which scenario is supported. For example, the IE format illustrated in Table 1-A may be used to indicate the network whether the UE supports the ML processing model and which scenario the TIE may support.

TABLE 1-A

```
Sensor-ML-model-processing := SEQUENCE {
    support-model Sensor-supported-model OPTIONAL,
    support-scenarios ENUMERATED (s1, s2, . . . ) OPTIONAL,
    . . .
}
```

If the UE supports the ML processing model, then the UE may indicate to the network whether the UE supports the standard model and/or a different version of the model. For example, the other version may be an operator specific model. For example, the IE format illustrated in Table 1-B may be used to indicate whether the UE supports the standard model and/or a model for a particular operator. For instance, the UE may indicate support for the standard model without supporting other versions of the model, e.g., without supporting models for a specific operator. The UE may indicate support for the standard model and one or more operator specific models. The UE may indicate support for an operator specific model without support for the standard model.

TABLE 1-B

```
Sensor-supported-model := SEQUENCE {
    supported-standard-model ENUMERATED (supported) OPTIONAL,
    supported-operator-model Supported-Operator-Model OPTIONAL,
    . . .
}
```

If the UE supports one or more versions of the model other than the common model, then the UE may indicate the supported versions. For example, the UE may support one or more versions of the model specific to an operator and may indicate the version(s) and the PLMN that may be associated with the supported version of the model. For example, the IE format illustrated in Table 1-C may be used to indicate the version of the model(s) supported by the UE and indicate the PLMN that may be associated with the supported version of the model.

TABLE 1-C

```
Supported-Operator-Model := SEQUENCE {
    version-of-model INTEGER (0,1,2 . . . ),
    associated-PLMN-ID PLMN-Identity,
    . . .
}
```

In response to the indication from the UE, the network may configure the UE to apply one of the versions of the ML processing model supported by the UE. That is, the network may configure the ML processing model for the UE and indicate to the UE which ML processing model should be used for the application. An operator-specific dictionary may be associated with PLMN ID.

The network may configure the UE to apply a particular version of the ML processing model. The network may configure the UE with the standard ML processing model or an operator specific ML processing model, (one of them or both). The network may configure the UE with a particular version of a machine learning model, e.g., a particular version of the standard model or a particular version of an operator specific ML model. The network may configure the parameters of the model. For example, the IE format illustrated in Table 2-A may be used to configure the UE with one of the versions of the ML processing model for the UE and the parameters of the model.

TABLE 2-A

```
Sensor-ML-Model ::= SEQUENCE {
    sensor-ML-supported-model ENUMERATED (standard,operator)
    OPTIONAL,
    sensor-model Sensor-model OPTIONAL,
    . . . .
}
```

Also, the network may configure the model content, mainly including two parts, including the structure and algorithm of the ML processing model, and the corresponding weights of the ML processing model. For example, the IE format illustrated in Table 2-B may be used to configure the UE with the structure and algorithm of the ML processing model, and the corresponding weights of the ML processing model.

TABLE 2-B

```
Sensor-model := SEQUENCE {
    Model-structure ENUMERATED (s1,s2, . . . . ) OPTIONAL,
    Model-weights ENUMERATED (w1,w2, . . . . ) OPTIONAL,
    . . . .
}
```

Figure 7:
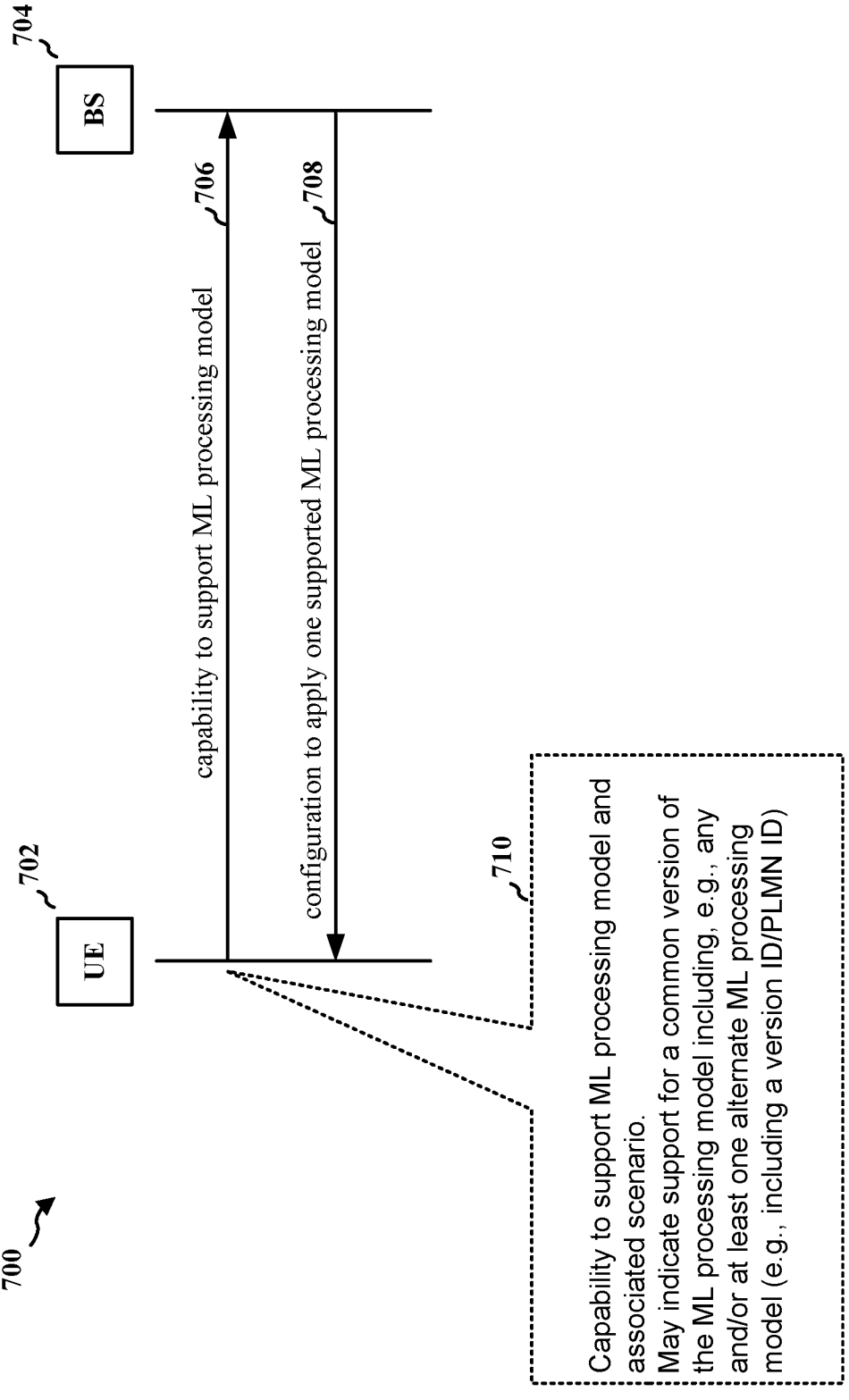
FIG. 7 is a call-flow diagram of wireless communication.

FIG. 7 is a call-flow diagram 700 of wireless communication, including the UE 702 and the base station 704. At 706, the UE 702 may indicate, to a wireless network (or base station) 704, a capability to support one or more versions of an ML processing model. The indication from the UE may indicate the capability to support one or more of a first version of the ML processing model that is common across wireless network operators and at least one operator specific version of the ML processing model, a version identifier of each operator specific machine learning model supported by the UE, and/or a PLMN ID associated with each operator specific machine learning models supported by the UE, such as illustrated at 710.

At 708, the base station 704 of the wireless network may configure the UE 702 to apply a version of the ML processing model that is supported by the UE 702. The configuration from the wireless network may indicate for the UE to use the first version of the ML processing model or an operator specific version of the ML processing model that is supported by the UE, a version identifier for the ML processing model configured for the UE, a PLMN ID associated with an operator specific machine learning model that is configured for the UE, and/or at least one of a network specific algorithm structure or one or more weights for an operator specific machine learning model that is supported by the UE, such as illustrated at 712.

Figure 8:
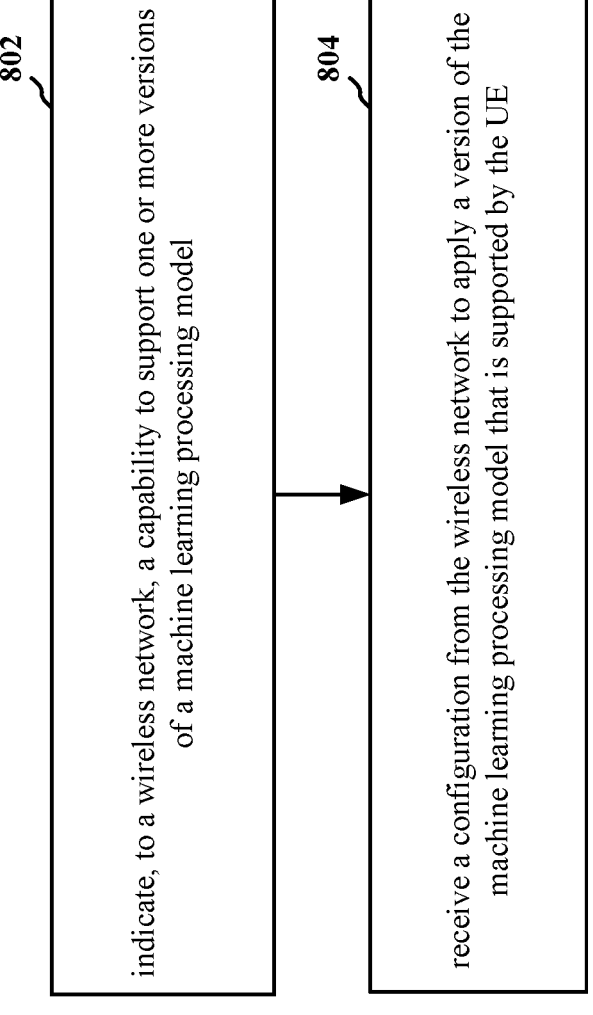
FIG. 8 is a flowchart of a method of wireless communication.

FIG. 8 is a flowchart 800 of a method of wireless communication. The method may be performed by a UE (e.g., the UE 104/402/502/602/612/622/702; the apparatus 802).

At 802, the UE may indicate, to a wireless network (or base station), a capability to support one or more versions of an ML processing model (e.g., as at 706). The indication from the UE may indicate the capability to support one or more of a first version of the ML processing model that is common across multiple wireless networks (e.g., multiple network operators) and at least one alternate version of the ML processing model. The alternate version of the ML processing model may be a network specific ML processing model, e.g., an operator specific ML processing model. The UE may indicate a version identifier of each alternate machine learning model supported by the UE, and/or a PLMN ID associated with each alternate machine learning models supported by the UE. For example, 802 may be performed by an ML processing model managing component 940.

At 804, the UE may receive a configuration from the wireless network to apply a version of the ML processing model that is supported by the UE (e.g., as at 708). The configuration from the wireless network may indicate for the UE to use the first version of the ML processing model or an alternate version of the ML processing model that is sup- ported by the UE (e.g., a network specific or operator specific ML processing model), a version identifier for the ML processing model configured for the UE, a PLMN ID associated with an alternate machine learning model that is configured for the UE, and/or at least one of a network specific algorithm structure or one or more weights for an alternate machine learning model that is supported by the UE. For example, 804 may be performed by the ML processing model managing component 940.

Figure 9:
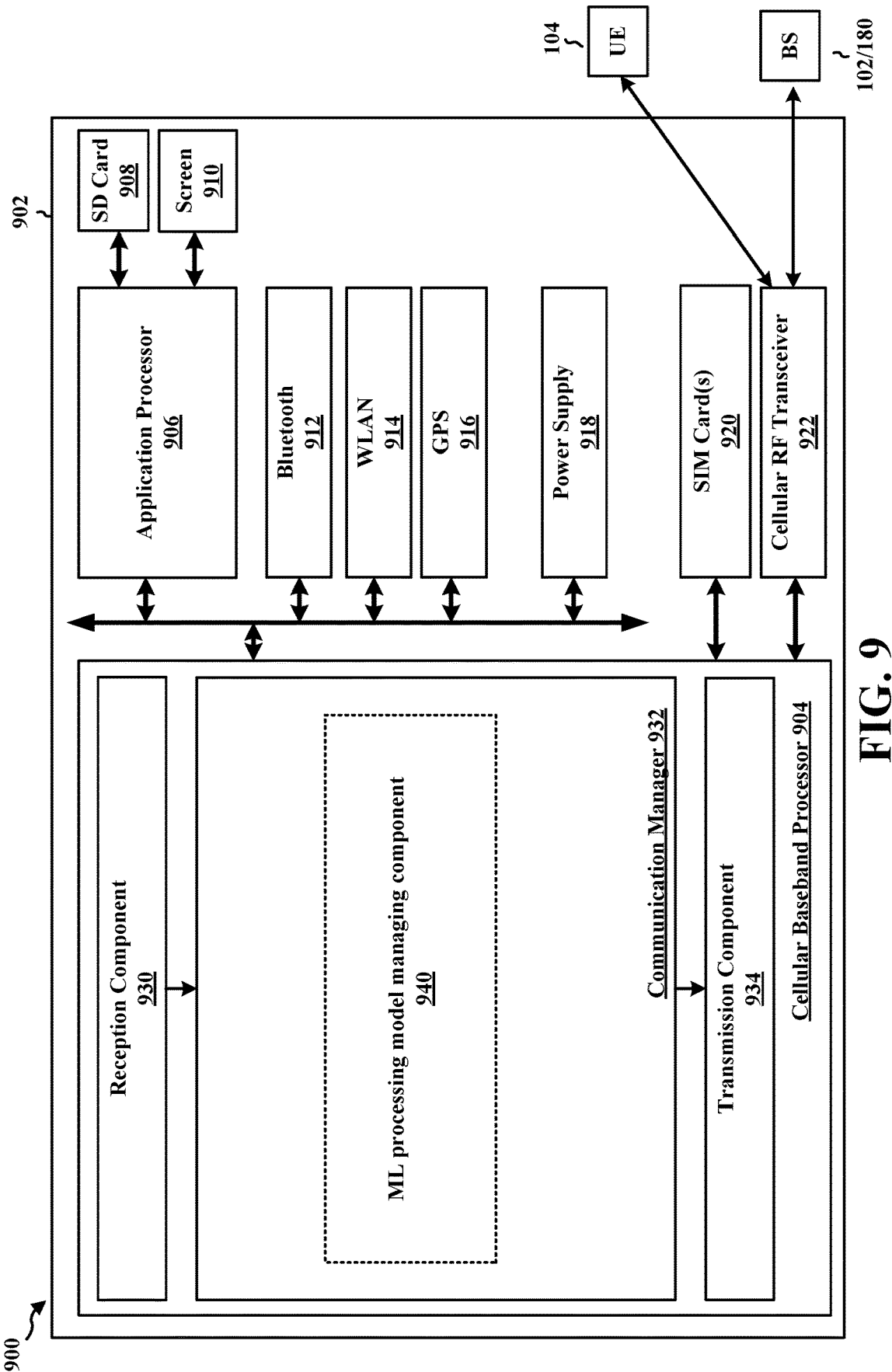
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/ memory. The computer-readable medium/memory may be non-transitory. The cellular baseband processor 904 is responsible for general processing, including the execution of software stored on the computer-readable medium/ memory. The software, when executed by the cellular base-band processor 904, causes the cellular baseband processor 904 to perform the various functions described supra. The computer-readable medium/memory may also be used for storing data that is manipulated by the cellular baseband processor 904 when executing software. The cellular base-band processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes an ML pro-cessing model managing component 940 that is configured to indicate, to a wireless network (or base station), a capa-bility to support one or more versions of an ML processing model, and receive a configuration from the wireless net-work to apply a version of the ML processing model that is supported by the UE, e.g., as described in connection with 802 and 804.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algo-rithm, stored within a computer-readable medium for imple-mentation by a processor, or some combination thereof.

In one configuration, the apparatus 902, and in particular the cellular baseband processor 904, includes means for indicating, to a wireless network, a capability to support one or more versions of an ML processing model, and means for receiving a configuration from the wireless network to apply a version of the ML processing model that is supported by the UE (e.g., the reception component 930, the ML process-ing model managing component 940, and/or the transmis-sion component 934). The aforementioned means may be one or more of the aforementioned components of the apparatus 902 configured to perform the functions recited by the aforementioned means. As described supra, the appara-tus 902 may include the TX Processor 368, the RX Processor 356, and the controller/processor 359. As such, in one configuration, the aforementioned means may be the TX Processor 368, the RX Processor 356, and the controller/ processor 359 configured to perform the functions recited by the aforementioned means.

Figure 10:
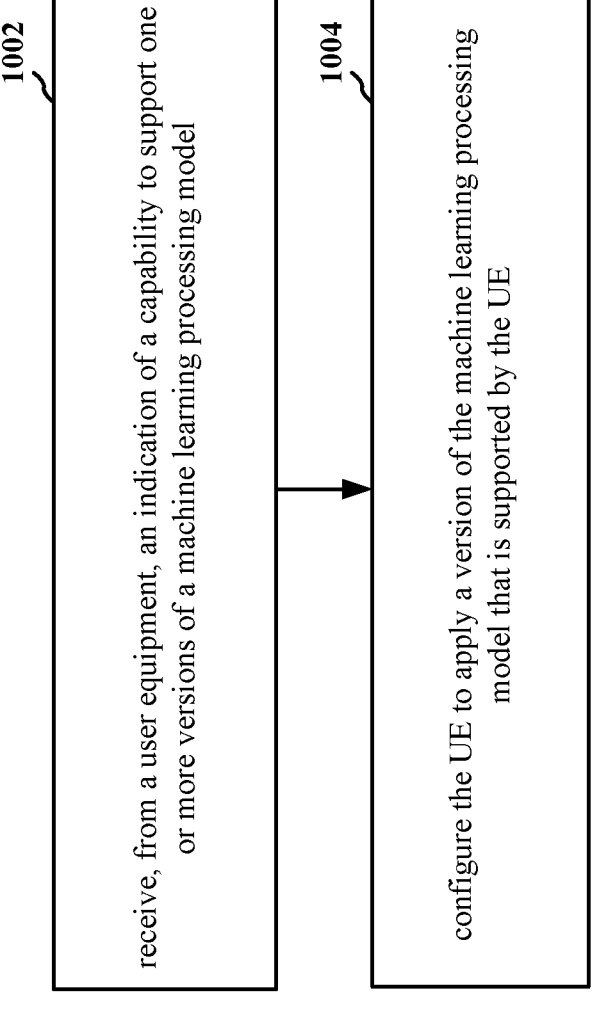
FIG. 10 is a flowchart of a method of wireless communication.
Figure 10:
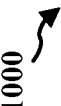

FIG. 10 is a flowchart 1000 of a method of wireless communication. The method may be performed by a base station (e.g., the base station 102/180/404/504/604/614/624/ 704; the apparatus 1102).

At 1002, the base station may receive, from a UE, an indication of a capability to support one or more versions of a machine learning processing model (e.g., as at 706). The indication from the UE may indicate the capability to support one or more of a first version of the ML processing model that is common across multiple wireless networks and at least one alternate version of the ML processing model (such as a network specific ML processing model or an operator specific ML processing mode) The UE may indi-cate support a version identifier of each alternate machine learning model supported by the UE, and/or a PLMN ID associated with each alternate machine learning models supported by the UE. For example, 1002 may be performed by an ML processing model managing component 940.

At 1004, the base station may configure the UE to apply a version of the machine learning processing model that is supported by the UE (e.g., as at 708). The configuration from the wireless network may indicate for the UE to use the first version of the ML processing model or an alternate version of the ML processing model that is supported by the UE, a version identifier for the ML processing model configured for the UE, a PLMN ID associated with an alternate machine learning model that is configured for the UE, and/or at least one of a network specific algorithm structure or one or more weights for an alternate machine learning model that is supported by the UE. For example, 1004 may be performed by the ML processing model managing component 940.

Figure 11:
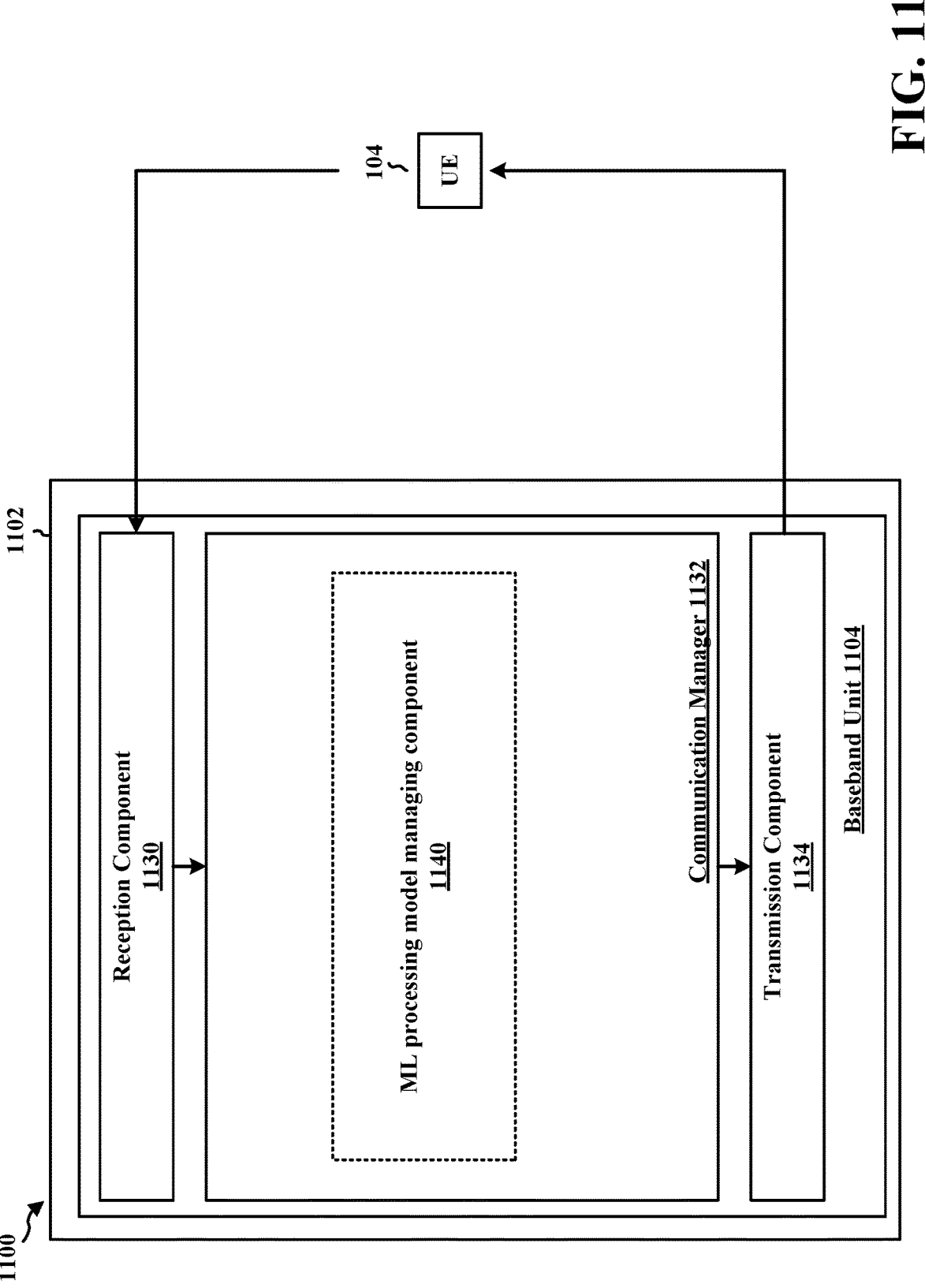
FIG. 11 is a diagram illustrating an example of a hardware implementation for an example apparatus.

FIG. 11 is a diagram 1100 illustrating an example of a hardware implementation for an apparatus 1102. The appa-ratus 1102 is a BS and includes a baseband unit 1104. The baseband unit 1104 may communicate through a cellular RF transceiver with the UE 104. The baseband unit 1104 may include a computer-readable medium/memory. The base-band unit 1104 is responsible for general processing, includ-ing the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes an ML processing model managing component 1140 that is configured to receive, from a UE, an indication of a capability to support one or more versions of a machine learning processing model, and configure the UE to apply a version of the machine learning processing model that is supported by the UE, e.g., as described in connection with 1002 and 1004.

The apparatus may include additional components that perform each of the blocks of the algorithm in the aforementioned flowcharts of FIGS. 7 and 10. As such, each block in the aforementioned flowcharts of FIGS. 7 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for receiving, from a UE, an indication of a capability to support one or more versions of a machine learning (ML) processing model, and means for configuring the UE to apply a version of the ML processing model that is supported by the UE. (e.g., the reception component 1130, the ML processing model managing component 1140, and/or the transmission component 1134). The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

A UE may indicate, to a wireless network, a capability to support one or more versions of an ML processing model, and a wireless network entity of the wireless network may configure the UE to apply a version of the ML processing model that is supported by the UE.

The indication from the UE may indicate; the capability to support one or more of a first version of the ML processing model that is common across wireless network operators and at least one operator specific version of the ML processing model, a version identifier of each operator specific machine learning model supported by the UE, and/or a Public Land Mobile Network (PLMN) identifier (ID) associated with each operator specific machine learning models supported by the UE.

The configuration from the wireless network may indicate; the UE to use the first version of the ML processing model or an operator specific version of the ML processing model that is supported by the UE, a version identifier for the ML processing model configured for the UE, a Public Land Mobile Network (PLMN) identifier (ID) associated with an operator specific machine learning model that is configured for the UE, and/or at least one of a network specific algorithm structure or one or more weights for an operator specific machine learning model that is supported by the UE.

The ML processing model may be for processing at least one of sensor data or wireless channel measurements. The UE may indicate to the wireless network a scenario for which the UE supports for at least one ML processing model.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means."

As such, no claim element is to be construed as a means plus function unless the element is expressly recited using the phrase "means for."

The following examples are illustrative only and may be combined with aspects of other examples or teachings described herein, without limitation.

Example 1 is a method of wireless communication at a UE, including: indicating, to a wireless network, a capability to support one or more versions of a machine learning processing model; and receiving a configuration from the wireless network to apply a version of the machine learning processing model that is supported by the UE.

Example 2 is the method of Example 1, wherein the UE indicates the capability to support one or more of a first version of the machine learning processing model that is common across multiple wireless networks and at least one alternate version of the machine learning processing model.

Example 3 is the method of any of Examples 1 or 2, wherein each alternate machine learning model includes at least one of a network specific algorithm structure or one or more network specific weights.

Example 4 is the method of any of Examples 1 to 3, wherein the UE indicates a version identifier of each alternate machine learning model supported by the UE.

Example 5 is the method of any of Examples 1 to 4, wherein the UE indicates a Public Land Mobile Network (PLMN) identifier (ID) associated with each alternate machine learning models supported by the UE.

Example 6 is the method of any of Example 1 to 5, wherein the configuration from the wireless network indicates to the UE to use the first version of the machine learning processing model or an alternate version of the machine learning processing model that is supported by the UE.

Example 7 is the method of any of Examples 1 to 6, wherein the wireless network indicates a version identifier for the machine learning processing model configured for the UE.

Example 8 is the method of any of Examples 1 to 7, wherein the wireless network indicates a Public Land Mobile Network (PLMN) identifier (ID) associated with an alternate machine learning model that is configured for the UE.

Example 9 is the method of any of Examples 1 to 8 wherein the configuration that the UE receives from the wireless network indicates at least one of a network specific algorithm structure or one or more weights for an alternate machine learning model that is supported by the UE.

Example 10 is the method of any of Examples 1 to 9, wherein the machine learning processing model is for processing at least one of sensor data or wireless channel measurements.

Example 11 is the method of any of Examples 1 to 10, wherein the UE indicates to the wireless network a scenario for which the UE supports for at least one machine learning processing model.

Example 12 is a device including one or more processors and one or more memories in electronic communication with the one or more processors storing instructions executable by the one or more processors to cause the device to implement a method as in any of Examples 1-11.

Example 13 is a system or apparatus including means for indicating, to a wireless network, a capability to support one or more versions of an ML processing model, and means for receiving a configuration from the wireless network to apply a version of the ML processing model that is supported by the UE.

Example 14 is the system or apparatus of Example 13 for implementing a method or realizing an apparatus as in any of Examples 1-11.

Example 15 is a non-transitory computer readable medium storing instructions executable by one or more processors to cause the one or more processors to implement a method as in any of Examples 1-11.

Example 16 is a method of wireless communication at a wireless network entity, including receiving, from a UE, an indication of a capability to support one or more versions of a machine learning processing model, and configuring the UE to apply a version of the machine learning processing model that is supported by the UE.

Example 17 is the method of Example 16, wherein the indication indicates the capability to support one or more of a first version of the machine learning processing model that is common across multiple wireless networks and at least one alternate version of the machine learning processing model.

Example 18 is the method of any of Examples 16 or 17, wherein each alternate machine learning model includes at least one of a network specific algorithm structure or one or more network specific weights.

Example 19 is the method of any of Examples 16 to 18, wherein the indication indicates a version identifier of each alternate machine learning model supported by the UE.

Example 20 is the method of any of Examples 16 to 19, wherein the indication indicates a Public Land Mobile Network (PLMN) identifier (ID) associated with each alternate machine learning models supported by the UE.

Example 21 is the method of any of Examples 16 to 20, wherein the wireless network entity configures the UE to use the first version of the machine learning processing model or an alternate version of the machine learning processing model that is supported by the UE.

Example 22 is the method of any of Examples 16 to 21, wherein the wireless network entity indicates a version identifier for the machine learning processing model configured for the UE.

Example 23 is the method of any of Examples 16 to 22, wherein the wireless network entity indicates a Public Land Mobile Network (PLMN) identifier (ID) associated with an alternate machine learning model that is configured for the UE.

Example 24 is the method of any of Examples 16 to 22, wherein the wireless network entity configures at least one of a network specific algorithm structure or one or more weights for an alternate machine learning model that is supported by the UE.

Example 25 is the method of any of Examples 16 to 24, wherein the machine learning processing model is for processing at least one of sensor data or wireless channel measurements.

Example 26 is the method of any of Examples 16 to 25, wherein the indication indicates to the wireless network a scenario for which the UE supports for at least one machine learning processing model.

Example 27 is a device including one or more processors and one or more memories in electronic communication with the one or more processors storing instructions executable by the one or more processors to cause the device to implement a method as in any of Examples 16-26.

Example 28 is a system or apparatus including means for receiving, from a UE, an indication of a capability to support one or more versions of a machine learning (ML) processing model, and means for configuring the UE to apply a version of the ML processing model that is supported by the UE.

Example 29 is the system or apparatus of Example 28 for implementing a method or realizing an apparatus as in any of Examples 16-26.

Example 30 is a non-transitory computer readable medium storing instructions executable by one or more processors to cause the one or more processors to implement a method as in any of Examples 16-26.

What is claimed is:

1. A method of wireless communication at a user equipment (UE), comprising:

transmitting, in a first wireless signal to a wireless network, an indication of a capability of the UE to support one or more versions of a machine learning (ML) processing model, wherein the indication indicates whether the UE supports one or more of a first version of the ML processing model that is common across multiple wireless networks and whether the UE supports at least one alternative version of the ML processing model that is optimized for the wireless network; and receiving, in a second wireless signal, a configuration from the wireless network to apply a version of the ML processing model supported by the UE, wherein the configuration indicates the version of the ML processing model determined based on the transmitted indication of the capability of the UE to support the one or more versions of the ML processing model, wherein the configuration configures the UE to use the first version of the ML processing model when the at least one alternative version of the ML processing model is not supported by the UE and configures the UE to use the at least one alternative version of the ML processing model when the at least one alternative version is supported by the UE.

2. The method of claim 1, wherein each alternative ML processing model includes at least one of a network specific algorithm structure or one or more network specific weights.

3. The method of claim 1, wherein the UE indicates a version identifier of each alternative ML processing model supported by the UE.

4. The method of claim 1, wherein the UE indicates a Public Land Mobile Network (PLMN) identifier (ID) associated with each alternative ML processing model supported by the UE.

5. The method of claim 1, wherein the configuration that the UE receives from the wireless network indicates a version identifier for the ML processing model configured for the UE.

6. The method of claim 1, wherein the configuration that the UE receives from the wireless network indicates a Public Land Mobile Network (PLMN) identifier (ID) associated with an alternative ML processing model that is configured for the UE.

7. The method of claim 1, wherein the configuration that the UE receives from the wireless network indicates at least one of a network specific algorithm structure or one or more weights for an alternative ML processing model that is supported by the UE.

8. The method of claim 1, wherein the ML processing model is for processing at least one of sensor data or wireless channel measurements.

9. The method of claim 1, wherein the UE indicates, to the wireless network, a scenario for which the UE supports the one or more versions of the ML processing model.

10. An apparatus for wireless communication at a user equipment (UE), comprising:

a memory; and one or more processors coupled to the memory and configured to cause the UE to:

transmit, in a first wireless signal to a wireless network, an indication of a capability of the UE to support one or more versions of a machine learning (ML) processing model, wherein the indication indicates whether the UE supports one or more of a first version of the ML processing model that is common across multiple wireless networks and whether the UE supports at least one alternative version of the ML processing model that is optimized for the wireless network; and receive, in a second wireless signal, a configuration from the wireless network to apply a version of the ML processing model supported by the UE, wherein the configuration indicates the version of the ML processing model determined based on the transmitted indication of the capability of the UE to support the one or more versions of the ML processing model, wherein the configuration configures the UE to use the first version of the ML processing model when the at least one alternative version of the ML processing model is not supported by the UE and configures the UE to use the at least one alternative version of the ML processing model when the at least one alternative version is supported by the UE.

11. The apparatus of claim 10, wherein each alternative ML processing model includes at least one of a network specific algorithm structure or one or more network specific weights.

12. The apparatus of claim 10, wherein the UE indicates a version identifier of each alternative ML processing model supported by the UE.

13. The apparatus of claim 10, wherein the UE indicates a Public Land Mobile Network (PLMN) identifier (ID) associated with each alternative ML processing model supported by the UE.

14. The apparatus of claim 10, wherein the configuration that the UE receives from the wireless network indicates a version identifier for the ML processing model configured for the UE.

15. The apparatus of claim 10, wherein the configuration that the UE receives from the wireless network indicates a Public Land Mobile Network (PLMN) identifier (ID) associated with an alternative ML processing model that is configured for the UE.

16. The apparatus of claim 10, wherein the configuration that the UE receives from the wireless network indicates at least one of a network specific algorithm structure or one or more weights for an alternative ML processing model that is supported by the UE.

17. The apparatus of claim 10, wherein the ML processing model is for processing at least one of sensor data or wireless channel measurements.

18. The apparatus of claim 10, wherein the one or more processors are further configured to cause the UE to indicate, to the wireless network, a scenario for which the UE supports the one or more versions of the ML processing model.

19. A method of wireless communication at a wireless network entity, comprising:

receiving an indication of a capability for a user equipment (UE) to support one or more versions of a machine learning (ML) processing model, wherein the indication indicates whether the UE supports one or more of a first version of the ML processing model that is common across multiple wireless networks and whether the UE supports at least one alternative version of the ML processing model that is optimized for a wireless network;

determining a version of the ML processing model to configure the UE to apply based on the indication of the capability received from the UE, wherein a first determination determines to configure the UE to use the first version of the ML processing model when the at least one alternative version of the ML processing model is not supported by the UE and a second determination determines to configure the UE to use the at least one alternative version of the ML processing model when the at least one alternative version is supported by the UE; and configuring the UE to apply the version of the ML processing model that is supported by the UE, wherein the configuration configures the UE to use the first version of the ML processing model when the at least one alternative version of the ML processing model is not supported by the UE and configures the UE to use the at least one alternative version of the ML processing model when the at least one alternative version is supported by the UE.

20. The method of claim 19, wherein each alternative ML processing model includes at least one of a network specific algorithm structure or one or more network specific weights.

21. The method of claim 19, wherein the indication indicates at least one of a version identifier of each alternative ML processing model supported by the UE or a Public Land Mobile Network (PLMN) identifier (ID) associated with each alternative ML processing model supported by the UE.

22. The method of claim 19, further comprising indicating at least one of:

a version identifier for the ML processing model configured for the UE, or a Public Land Mobile Network (PLMN) identifier (ID) associated with an alternative ML processing model that is configured for the UE.

23. The method of claim 19, further comprising configuring at least one of a network specific algorithm structure or one or more weights for an alternative ML processing model that is supported by the UE.

24. An apparatus for wireless communication at a wireless network entity, comprising:

memory; and one or more processors coupled to the memory and configured to cause the wireless network entity to:

receive an indication of a capability for a user equipment (UE) to support one or more versions of a machine learning (ML) processing model, wherein the indication indicates whether the UE supports one or more of a first version of the ML processing model that is common across multiple wireless networks and whether the UE supports at least one alternative version of the ML processing model that is optimized for a wireless network;

determine a version of the ML processing model to configure the UE to apply based on the indication of the capability received from the UE, wherein a first determination determines to configure the UE to use the first version of the ML processing model when the at least one alternative version of the ML processing model is not supported by the UE and a second determination determines to configure the UE to use the at least one alternative version of the ML processing model when the at least one alternative version is supported by the UE; and configure the UE to apply the version of the ML processing model that is supported by the UE, wherein the configuration configures the UE to use the first version of the ML processing model when the at least one alternative version of the ML processing model is not supported by the UE and configures the UE to use the at least one alternative version of the ML processing model when the at least one alternative version is supported by the UE.

25. The apparatus of claim 24, wherein each alternative ML processing model includes at least one of a network specific algorithm structure or one or more network specific weights.

26. The apparatus of claim 24, wherein the indication indicates a version identifier of each alternative ML processing model supported by the UE.

27. The apparatus of claim 24, wherein the indication indicates a Public Land Mobile Network (PLMN) identifier (ID) associated with each alternative ML processing model supported by the UE.

28. The apparatus of claim 24, wherein the one or more processors are configured to cause the wireless network entity to indicate a version identifier for the ML processing model configured for the UE.

29. The apparatus of claim 24, wherein the one or more processors are configured to cause the wireless network entity to indicate a Public Land Mobile Network (PLMN) identifier (ID) associated with an alternative ML processing model that is configured for the UE.

30. The apparatus of claim 24, wherein the one or more processors are configured to cause the wireless network entity to configure at least one of a network specific algorithm structure or one or more weights for an alternative ML processing model that is supported by the UE.

31. The apparatus of claim 24, wherein the ML processing model is for processing at least one of sensor data or wireless channel measurements.

32. The apparatus of claim 24, wherein the indication indicates to the wireless network entity a scenario for which the UE supports the one or more versions of the ML processing model.

* * * * *